United States Patent
Zhang et al.

(10) Patent No.: US 8,086,002 B2
(45) Date of Patent: Dec. 27, 2011

(54) ALGORITHMS FOR SELECTING MASS DENSITY CANDIDATES FROM DIGITAL MAMMOGRAMS

(75) Inventors: Heidi Daoxian Zhang, Los Gatos, CA (US); Patrick Bernard Heffernan, Los Gatos, CA (US)

(73) Assignee: Three Palm Software, Los Gatos, CA (US)

( * ) Notice: Subject to any disclaimer, the term of this patent is extended or adjusted under 35 U.S.C. 154(b) by 882 days.

(21) Appl. No.: 12/099,785

(22) Filed: Apr. 9, 2008

(65) Prior Publication Data

US 2008/0267470 A1    Oct. 30, 2008

Related U.S. Application Data

(60) Provisional application No. 60/926,420, filed on Apr. 27, 2007.

(51) Int. Cl.
*G06K 9/00*    (2006.01)
(52) U.S. Cl. ......... 382/128; 382/129; 382/130; 382/131
(58) Field of Classification Search ........... 382/128–132
See application file for complete search history.

(56) References Cited

U.S. PATENT DOCUMENTS

| | | | | |
|---|---|---|---|---|
| 5,365,429 A | * | 11/1994 | Carman | 378/37 |
| 5,452,367 A | * | 9/1995 | Bick et al. | 382/128 |
| 5,825,936 A | * | 10/1998 | Clarke et al. | 382/261 |
| 5,830,141 A | * | 11/1998 | Makram-Ebeid et al. | 600/407 |
| 2008/0033288 A1 | * | 2/2008 | Wang et al. | 600/427 |
| 2008/0152220 A1 | * | 6/2008 | Shi et al. | 382/164 |

* cited by examiner

*Primary Examiner* — Manav Seth
(74) *Attorney, Agent, or Firm* — Haynes and Boone, LLP

(57) ABSTRACT

The present invention provides a method for selecting mass density candidates from digital image, for example mammograms, for computer-aided lesion detection, review and diagnosis. A method of selecting mass density candidates from a digital image for computer-aided cancer detection, review and diagnosis includes down-sampling the digital image to a low resolution; smoothing an edge along a skinline; applying a Gaussian difference filter to enhance intensity to form a filtered image; masking the filtered image using a breast mask; using a Canny detector to find potential mass density contours; and generating a mass density candidate list from Canny contours produced in the Canny detector.

8 Claims, 3 Drawing Sheets

ALGORITHMS FOR SELECTING MASS DENSITY CANDIDATES FROM DIGITAL MAMMOGRAMS

REFERENCES

U.S. Patent Documents

1. U.S. Pat. No. 5,615,243 March 1997 Chang et al. "Identification of suspicious mass regions in mammograms"
2. U.S. Pat. No. 5,832,103 November 1998 Giger et al. "Automated method and system for improved computerized detection and classification of masses in mammograms"
3. U.S. Pat. No. 6,246,782 June 2001 Shapiro et al. "System for automated detection of cancerous masses in mammograms"

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates generally to the field of medical imaging analysis. Particularly, the present invention relates to a method and system for candidates selection of mass density from digital mammography images in conjunction with computer-aided detection, review and diagnosis (CAD) for mammography CAD server and digital mammography workstation.

The U.S. patent Classification Definitions: 382/254 (class 382, Image Analysis, subclass 254 Image Enhancement or Restoration); 382/128 (class 382, Image Analysis, subclass 128 Biomedical applications).

Mass density candidates are the locations on mammograms that are used as initial regions of interest to detect potential breast cancers that present abnormal signs of mass densities or architectural distortions. Most existing candidate selection algorithms are based on the intensity of the images, such as, a combination of the global maximum and local maximum (see U.S. Pat. No. 5,615,243 issued in March, 1997, to Chang et al. entitled "Identification of suspicious mass regions in mammograms"), multi-gray-level thresholding on a subtracted image (see U.S. Pat. No. 5,832,103 issued in November, 1998, to Giger et al. entitled "Automated method and system for improved computerized detection and classification of masses in mammograms"), peak selection from multiple Fourier band-pass images (see U.S. Pat. No. 6,246,782 issued in June, 2001, to Shapiro et al. entitled "System for automated detection of cancerous masses in mammograms"). Using a limited discrete number of levels or bands to select the mass densities, which have a continuous range of intensity levels and sizes, requires ad hoc adjustment of a large number of parameters. Intensity-based methods also usually perform calculations on multiple images, which results in expensive computation.

Accordingly, a method of selecting mass density candidates from a digital image for computer-aided cancer detection, review and diagnosis includes down-sampling the digital image to a low resolution; smoothing an edge along a skinline; applying a Gaussian difference filter to enhance intensity to form a filtered image; masking the filtered image using a breast mask; using a Canny detector to find potential mass density contours; and generating a mass density candidate list from Canny contours produced in the Canny detector.

BRIEF SUMMARY OF THE INVENTION

This invention makes use of both intensity and morphologic algorithms to process each image at a single gray-level to select the candidates. The detailed algorithm is shown in FIG. 2. Because both intensity and morphological information are used, the selection sensitivity is better than algorithms that use intensity alone. Since each image is processed at only one gray level, the processing time is fast. The typical time to generate around 25 candidates from one mammogram image is less than 500 ms, which is much faster than a comparable band-pass method, which typically takes more than 5 seconds for a single mammogram.

The presented candidate selection algorithm can be also used to select mass candidates from ultrasound images, from 3D tomosynthesis mammography images and from breast MRI images.

Accordingly, a method of selecting mass density candidates from a digital image for computer-aided cancer detection, review and diagnosis includes down-sampling the digital image to a low resolution; smoothing an edge along a skinline; applying a Gaussian difference filter to enhance intensity to form a filtered image; masking the filtered image using a breast mask; using a Canny detector to find potential mass density contours; and generating a mass density candidate list from Canny contours produced in the Canny detector.

DETAILED DESCRIPTION OF THE INVENTION

The present invention provides a method for selecting mass density candidates from mammograms for computer-aided lesion detection, review and diagnosis. The method has two steps: a Gaussian difference filter to enhance the intensity and a Canny detector to find potential mass density contours. For circumscribed masses, an additional Hough circle detector is used. This invention makes use of both intensity and morphology information and only processes each image at a single gray-level, so both sensitivity and processing time are improved. The selection algorithm can be also used to select mass candidates from ultrasound images, from 3D tomosynthesis mammography images and from breast MRI images.

Figure 1:
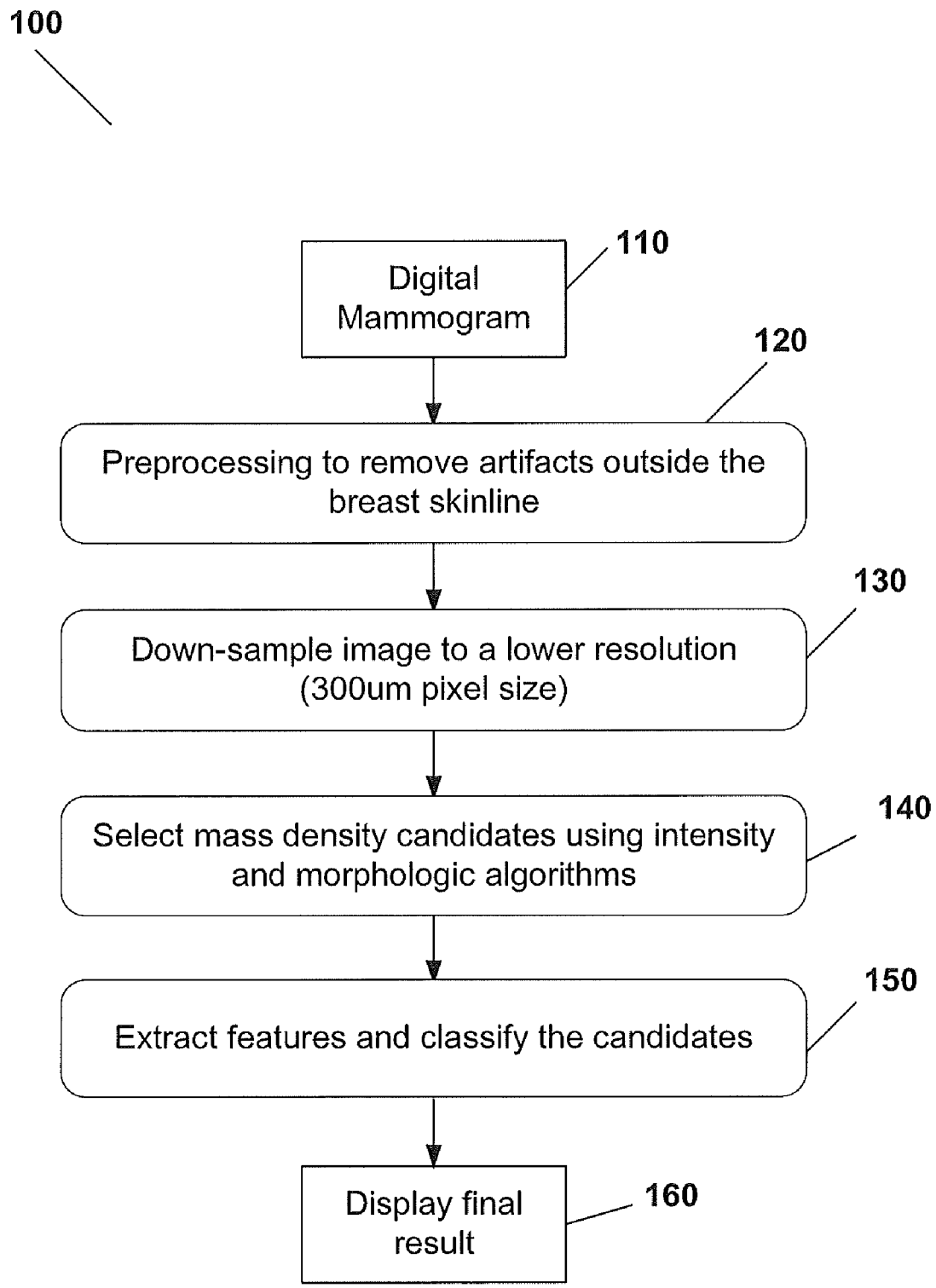
FIG. 1 provides overview of mass candidate selection algorithm.

As shown in process 100 illustrated in FIG. 1, the input to the mass candidate selection algorithm is a breast image 110 such as a digital mammogram image, or a breast image 110 from other modality (e.g., ultrasound, 3D tomosynthesis, or MRI). The image 110 is preprocessed to remove artifacts outside the breast tissue in step 110. The image resolution of a digital mammogram is usually between 50 um to 100 um. The image therefore can be down-sampled in step 130 to a lower resolution, i.e., 300 um, in order to improve processing speed without compromising processing quality. The algorithm to select mass density candidate, step 140, uses this down-sampled image. Once step 140 is completed, features are extracted and classified in step 150 and the final results displayed in step 160.

Figure 2:
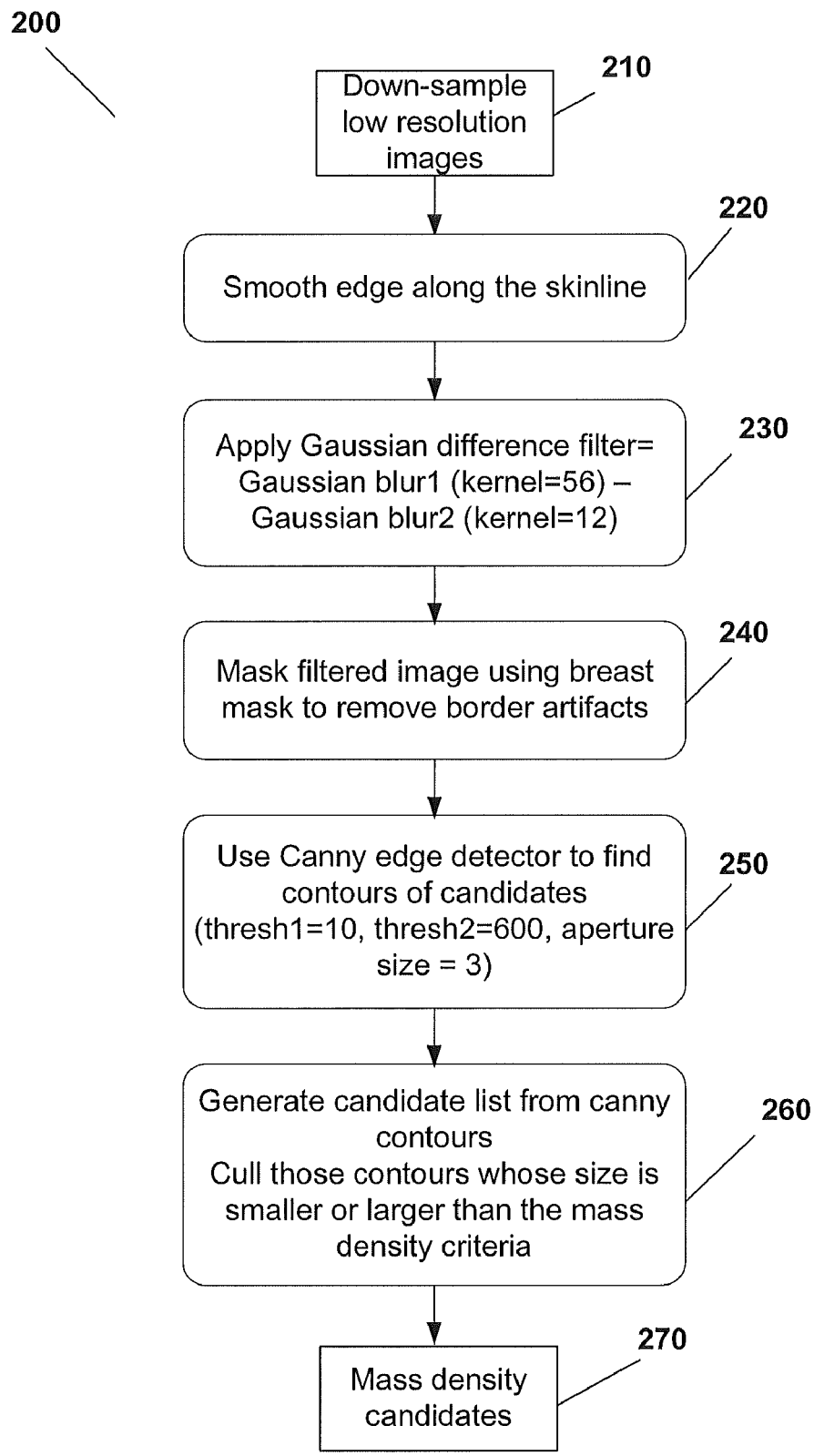
FIG. 2 details the mass candidate selection algorithm.
Figure 3:
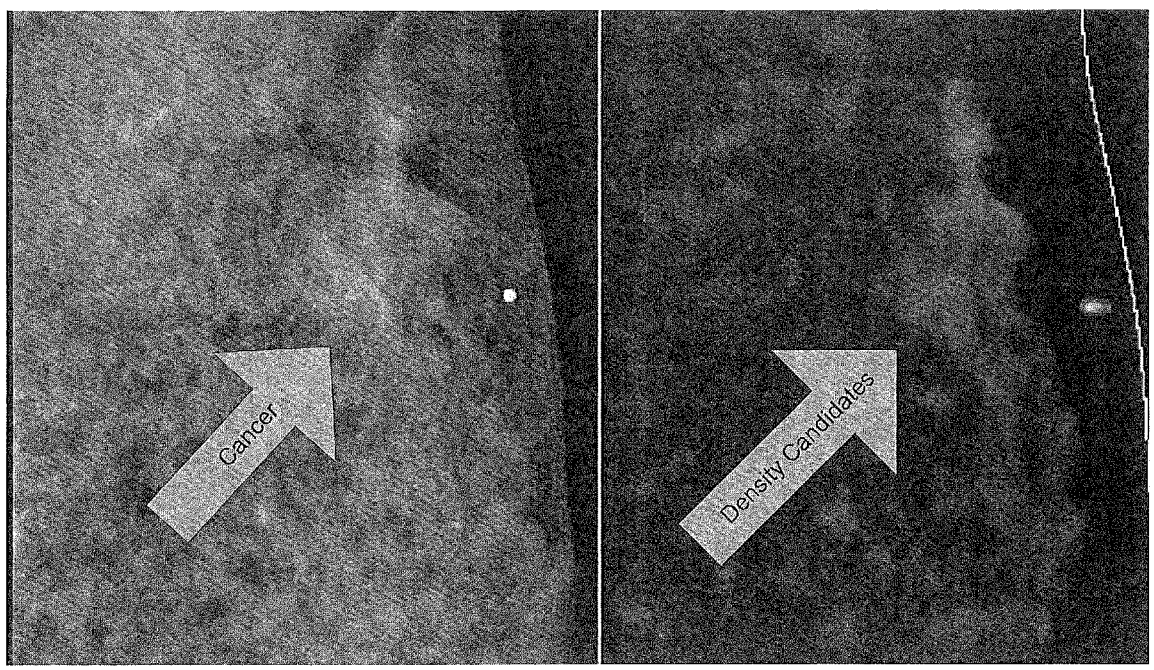
FIG. 3 shows an example of the algorithm result.

As shown in process 200 illustrated in FIG. 2, the down-sampled image 210, which is output from step 130, is smoothed along the edge of the skinline in step 220. A Gaussian difference filter 230 is then applied to the smoothed image (FIG. 3 illustrates the original image 110 and the Gaussian difference filtered image from step 230). In some embodiments, the first Gaussian filter kernel size is selected as 56; and the second Gaussian filter kernel size is selected as 12. The filtered image is masked by breast mask in step 240 to remove border artifacts. Next step 250 is to use Canny edge detector to find contours of the candidates. In some embodiments, the first threshold of the Canny edge detector is selected as 10; and the second threshold of the Canny edge detector is selected as 600. The thresholds are used for edge linking. The aperture parameter for Sobel operator in the implementation of the Canny detector is 3. Finally the candidates are generated from the Canny contours in step 260. Those contours that the size either is smaller (<5 mm) or larger (>50 mm) than the mass density criteria are culled from the final results (see circles overlaid over the cancer in FIG. 3). The output from process 200 is the mass density candidates 270.

The invention claimed is:

1. A method of selecting mass density candidates from a digital image for computer-aided cancer detection, review and diagnosis, comprising:

down-sampling the digital image to a low resolution;
smoothing an edge along a skinline;
applying a Gaussian difference filter to enhance intensity to form a filtered image;
masking the filtered image using a breast mask;
using a Canny detector to find potential mass density contours; and
generating a mass density candidate list from Canny contours produced in the Canny detector.

2. The method of claim 1, wherein the Gaussian difference filter includes parameters of a first kernel size 56 and a second kernel size 12.

3. The method of claim 1, wherein the Canny detector includes parameters of a first threshold 10 and a second threshold 600; and an aperture size of 3.

4. The method of claim 1, wherein the Canny detector for circumscribed masses utilizes an additional Hough circle detector.

5. The method of claim 1, wherein the digital image is a mammography image.

6. The method of claim 1, wherein the digital image is an ultrasound image.

7. The method of claim 1, wherein the digital image is a 3D tomosynthesis mammography image.

8. The method of claim 1, wherein the digital is a breast MRI image.

* * * * *